United States Patent
Herloski et al.

(10) Patent No.: US 7,545,543 B2
(45) Date of Patent: Jun. 9, 2009

(54) SCANNER ILLUMINATOR SYSTEMS AND METHODS

(75) Inventors: Robert Herloski, Webster, NY (US); Douglas E. Proctor, Rochester, NY (US); Charles J. Urso, Jr., Webster, NY (US)

(73) Assignee: Xerox Corporation, Norwalk, CT (US)

( * ) Notice: Subject to any disclaimer, the term of this patent is extended or adjusted under 35 U.S.C. 154(b) by 925 days.

(21) Appl. No.: 11/008,537

(22) Filed: Dec. 9, 2004

(65) Prior Publication Data

US 2006/0126130 A1 Jun. 15, 2006

(51) Int. Cl.
*H04N 1/04* (2006.01)
(52) U.S. Cl. .................. 358/475; 358/471; 358/474; 358/497
(58) Field of Classification Search .......... 358/475, 358/471, 497, 498, 506, 509, 505, 484, 474; 250/229, 208.1; 382/312, 323; 345/104, 345/207; 349/110, 112, 65; 348/272, 276, 348/277, 280, 282, 294, 296, 311
See application file for complete search history.

(56) References Cited

U.S. PATENT DOCUMENTS

| | | | |
|---|---|---|---|
| 4,760,606 A | 7/1988 | Lesnick et al. | |
| 4,833,533 A | 5/1989 | Augusti et al. | |
| 4,933,754 A * | 6/1990 | Reed et al. | 358/506 |
| 5,038,224 A * | 8/1991 | Martulli et al. | 250/229 |
| 5,267,335 A | 11/1993 | Mita | |
| 5,283,563 A * | 2/1994 | Allen et al. | 349/65 |
| 5,291,307 A | 3/1994 | Luckhusrt | |
| 5,313,311 A | 5/1994 | Brandkamp | |
| 5,416,610 A * | 5/1995 | Kikinis | 358/474 |
| 5,430,462 A | 7/1995 | Katagiri et al. | |
| 5,644,409 A | 7/1997 | Irie et al. | |
| 5,691,788 A * | 11/1997 | Kim | 349/110 |
| 5,742,881 A | 4/1998 | McTigue | |
| 5,898,275 A | 4/1999 | Taillie et al. | |
| 6,005,990 A * | 12/1999 | Barrett et al. | 382/323 |
| 6,111,669 A | 8/2000 | Nordstrom | |
| 6,236,470 B1 | 5/2001 | Seachman | |
| 6,396,218 B1 | 5/2002 | Proctor | |
| 6,587,231 B1 * | 7/2003 | Sung | 358/497 |
| 6,594,038 B1 | 7/2003 | Ikeda | |
| 6,596,979 B2 | 7/2003 | Hou | |
| 7,362,478 B2 * | 4/2008 | Mangerson | 358/474 |
| 2004/0095617 A1 | 5/2004 | Mangerson | |
| 2004/0257627 A1 * | 12/2004 | McClurg | 358/509 |
| 2005/0099619 A1 * | 5/2005 | McClurg et al. | 358/474 |

FOREIGN PATENT DOCUMENTS

JP 2004-193718 8/2004

* cited by examiner

*Primary Examiner*—Houshang Safaipour
(74) *Attorney, Agent, or Firm*—Gibb I.P. Law Firm, LLC

(57) ABSTRACT

A scanner includes an illuminator and a platen adapted to support a document to be scanned. A light source directs light into the platen and the light is reflected internally within the platen. A movable light sensor is positioned adjacent the platen. Liquid crystal sections between the document and the light sensor cause a zone of light to pass from the platen to the document, thereby illuminating only a portion of the document.

20 Claims, 5 Drawing Sheets

SCANNER ILLUMINATOR SYSTEMS AND METHODS

BACKGROUND

Embodiments herein generally relate to scanner systems and methods. Scanners are useful in sensing shapes, images, and text on an item such as a substrate sheet. Digital and analog signals from scanners are used by computers and other devices to convert the shapes, images, and text into digitized images, text documents, number codes, etc. There is a constant need to make scanners smaller, less expensive, and more reliable.

SUMMARY

An illuminator for a scanner according to embodiments herein comprises a platen, a light source directing light into the platen, and a liquid crystal diffuser as part of or in direct optical contact with the platen. The liquid crystal diffuser has addressable liquid crystal regions that permit addressable light extraction zones of the platen (light to be emitted from zones of the platen). More specifically, one or more liquid crystal strips are activated (made non-transparent) next to a strip that is not activated (is transparent) to create an illumination zone. The imaging system captures the light that is reflected from the substrate (document) and passes through the non-activated (transparent) liquid crystal strip that is directly next to (or between) the liquid crystal strip(s) that are non-transparent.

The addressed elements of the liquid crystal diffuser are varied such that the illumination zone shifts (moves) along a length of the platen over time. This movement of the illumination zone is coordinated with the movement of the imaging system so that only the portion of the substrate that is above the imaging system is illuminated. The illumination zone caused by the activated liquid crystal regions runs from one edge of the platen to an opposite edge of the platen as it moves along the length of the platen to allow the imaging system to sequentially sense different sections of the document.

A scanner embodiment includes such an illuminator. In such a scanner, the platen is adapted to support a document to be scanned. The light source directs light into the platen and the light undergoes total internal reflection (TIR) within the platen. The movable imaging system is positioned adjacent to the liquid crystal sections of the diffuser or platen. Thus, the liquid crystal sections are between the internal portions of the platen and the imaging system. The addressed liquid crystal elements serve to frustrate TIR and cause one or more zones (strips, slits, etc.) of light to pass from the platen to the document, thereby illuminating only a portion of the document.

The liquid crystal diffuser or platen can include multiple longitudinal liquid crystal zone sections adapted to change transparency or multiple rectangular liquid crystal sections adapted to change transparency. The planar dimensions of the liquid crystal diffuser approximately match the planar dimensions of the platen. These and other features are described in, or are apparent from, the following detailed description of various exemplary system and method embodiments.

BRIEF DESCRIPTION OF THE DRAWINGS

Various exemplary embodiments of the systems and methods described in detail below, with reference to the attached drawing figures, in which.

DETAILED DESCRIPTION

While the following embodiments are described hereafter with reference to a scanner, it should be understood that embodiments herein are not strictly limited to scanners. Rather, any device that senses light from a substrate is contemplated by this disclosure.

Figure 1:
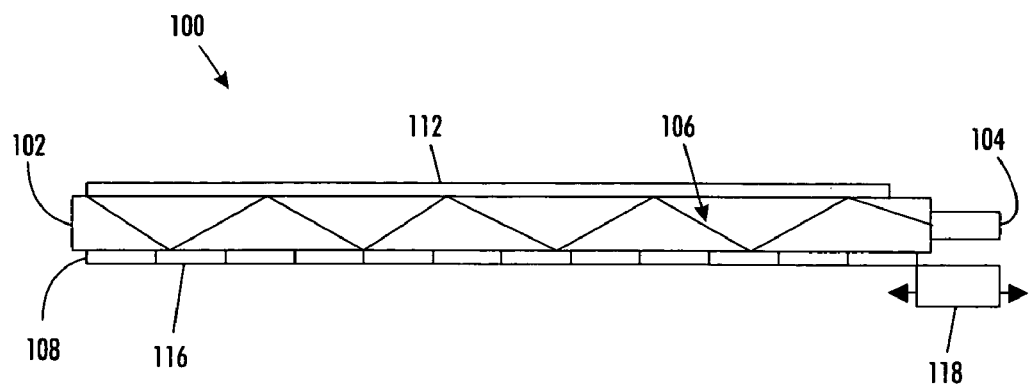
FIG. 1 is a cross-sectional schematic representation of a scanner.
Figure 2:
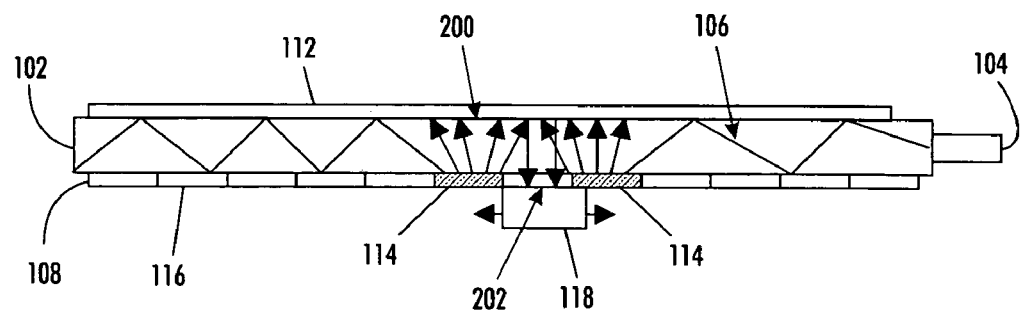
FIG. 2 is a cross-sectional schematic representation of a scanner.
Figure 3:
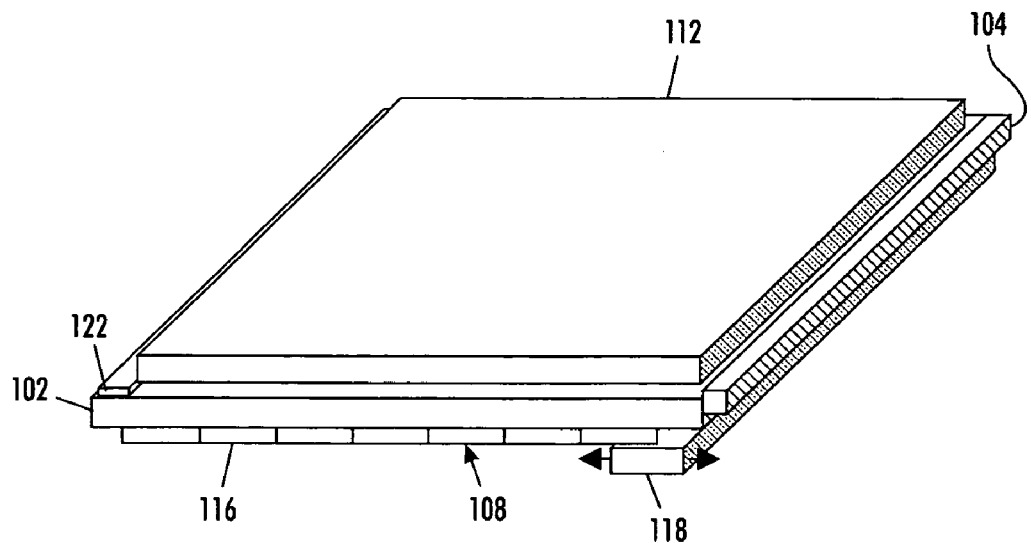
FIG. 3 is a perspective-view schematic representation of a scanner.
Figure 4:
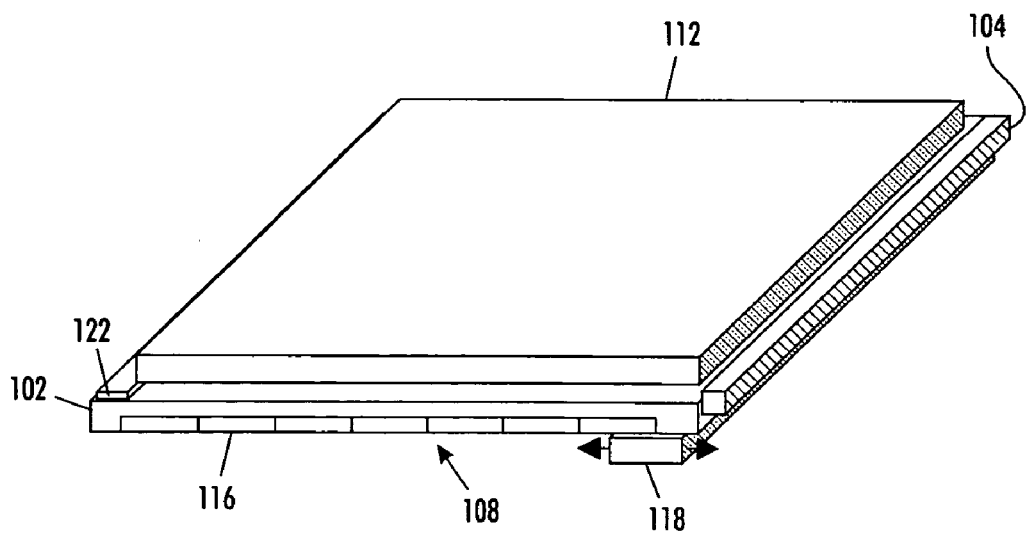
FIG. 4 is a perspective-view schematic representation of a scanner.

FIGS. 1 and 2 are cross-sectional views, and FIG. 3 is a perspective view of the same scanner device. As shown in FIG. 1, an illuminator for a scanner 100 according to embodiments herein, comprises a platen 102, a light source 104 directing light 106 into the platen 102, and a liquid crystal diffuser 108 (having liquid crystal regions 116) in direct optical contact with the platen 102. Alternatively, as shown in FIG. 4, the liquid crystal regions 116 can be included within the platen 102 as an integral part of the platen 102. Thus, the liquid crystal regions 116 are on the bottom (or are part of the bottom) of the platen 102 and are between the substrate 112 (that is on top of the platen 102) and the imaging system 118.

As shown in FIG. 1, the light 106 generated from the light source 104 is reflected internally within the platen 102. As discussed below, this internal reflection (total internal reflection (TIR)) is intentionally frustrated (in FIG. 2) to allow the light 200 to escape from the platen 102 at limited locations. The concept of frustrated TIR is well-known and is discussed, for example in U.S. Pat. No. 5,841,916 and U.S. Patent Publication 2004/0146188, the disclosures of which are incorporated herein by reference. Embodiments herein apply frustrated TIR to platens of scanners.

The liquid crystal diffuser 108 can include multiple longitudinal rectangular zone sections 116 (shown in FIG. 5), multiple rectangular pixels 130 (shown in FIG. 6), or other suitable geometries adapted to change transparency. A detailed discussion of liquid crystal devices and their various manufacturing processes are discussed in U.S. Pat. No. 5,418,631, the disclosure of which is incorporated herein by reference.

The liquid crystal sections 116 (FIG. 5) and rectangular sections 130 (FIG. 6) are regions of the liquid crystal material that are independently addressable (independently controllable). Therefore, one rectangular strip 116 or rectangular pixel 130 liquid crystal section can be independently activated or inactivated without regard to the activation of adjacent sections. The planar dimensions of the liquid crystal diffuser 108 approximately match the planar dimensions of the platen 102.

In this discussion, the liquid crystal sections 116 and pixels 130 are transparent when inactivated (voltage absent) and diffusely reflective when activated (voltage present); however, as would be understood by one ordinarily skilled in the art, an opposite polarity system could be used with equal effectiveness. Inactivated, the regions 116 and pixels 130 are transparent and a document 112 positioned on the platen 102 will not be adequately illuminated because the majority of light rays 106 from the illumination source 104 are totally internally reflected within the platen 102. Activating a region 116 or pixel 130 causes the region 116 or pixel 130 to become diffusely reflecting, resulting in scattering of the light rays 200 within that region of the platen 102 (frustrating the TIR within that region of the platen 102).

For example, regions 114 are shown as being activated in FIG. 2, which causes light rays (arrows 200 in FIG. 2) to scatter and exit the platen 102. As discussed above, this frustrates total internal reflection within the platen 102 in the region above section 114 causing only the region of the document 112 that is above and immediately adjacent section 114 to be illuminated with light 200. Thus, this scattering of the light rays 200 illuminates the portion of the document 112 that is directly above and adjacent to the activated liquid crystal region 114. These light rays 200 illuminate the substrate 112 and are reflected back through the platen (as shown by arrows 202) to the imaging system 118.

As shown in FIG. 2, one or more liquid crystal regions 114 are activated (made non-transparent) next to a liquid crystal region that is not activated (is transparent) to create an illumination zone or zone of light where light rays 200 are transmitted through the platen 102. The imaging system 118 captures light 202 that is reflected from the substrate (document) 112 and passes through the non-activated (transparent) liquid crystal strip that is directly next to (or between) the liquid crystal region(s) 114 that are non-transparent. While two liquid crystal regions 114 are illustrated as being activated in FIG. 2, one ordinarily skilled in the art would understand that only one region 114 could be activated, or that multiple regions 114 on each side of the transparent region could be activated, depending upon the specific type of substrate 112 and imaging system 118 that the scanner 100 is designed to be used with.

The activation of the addressed elements 116 are varied such that the illumination zone shifts (moves) along a length of the platen over time. This movement of the illumination zone is synchronized with the movement of the imaging system 118 so that only the portion of the substrate that is above the light sensor 118 is illuminated. Therefore, each liquid crystal region 116 is activated as the imaging system 118 approaches it. As the imaging system 118 begins to pass under an activated region 116, the region 116 returns back to the inactive (transparent) state. The illumination zone caused by the activated liquid crystal regions 114 runs from one edge of the platen 102 to an opposite edge of the platen 102 as it moves along the length of the platen 102 to allow the imaging system 118 to sequentially sense different sections of the document 112.

The imaging system 118 that is positioned adjacent the liquid crystal diffuser 108 is movable as indicated by the arrows in the drawings. A discussion of light sensors and structures utilized to move the imaging system is discussed in U.S. Pat. No. 5,442,449, and that disclosure is incorporated herein by reference.

Figure 5:
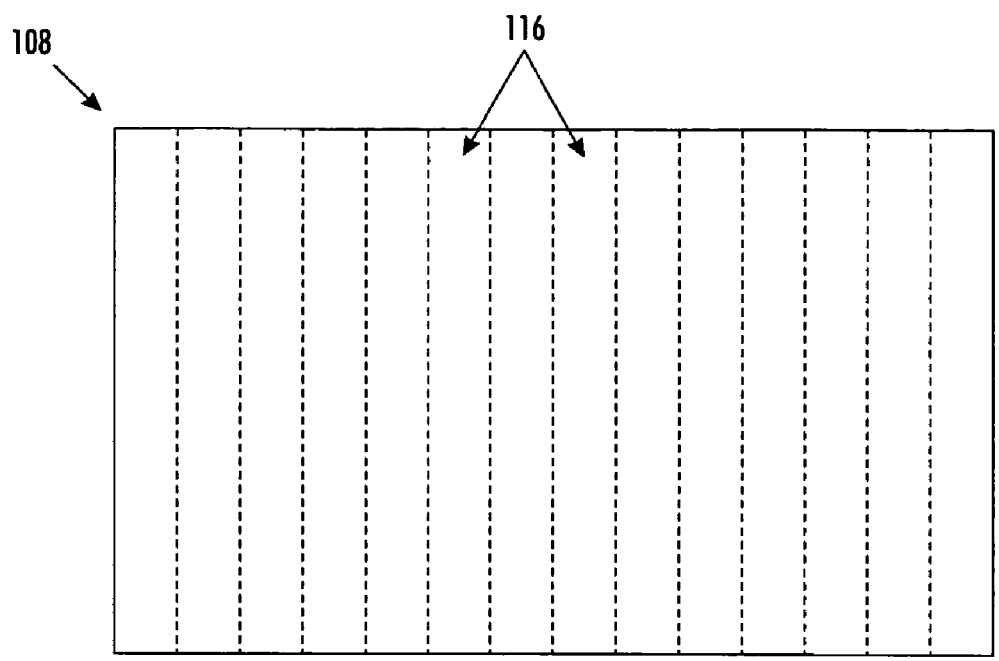
FIG. 5 is a top-view schematic representation of a liquid crystal diffuser.

Thus, as shown in FIGS. 1-4, the liquid crystal regions 116 allow only a limited width (e.g., illumination zone) of light (as indicated by arrows 200) to be transmitted through the platen 102 to the document 112. The liquid crystal regions 116 shown in FIG. 5 are patterned in a single direction, parallel to the light source 104 and the imaging system 118, enabling zones (strips) of illumination. The array of liquid crystal pixels 130 in FIG. 6, similarly allow essentially rectangular (e.g., square) regions of light to pass from the platen 102 to illuminate the document 112.

Figure 6:
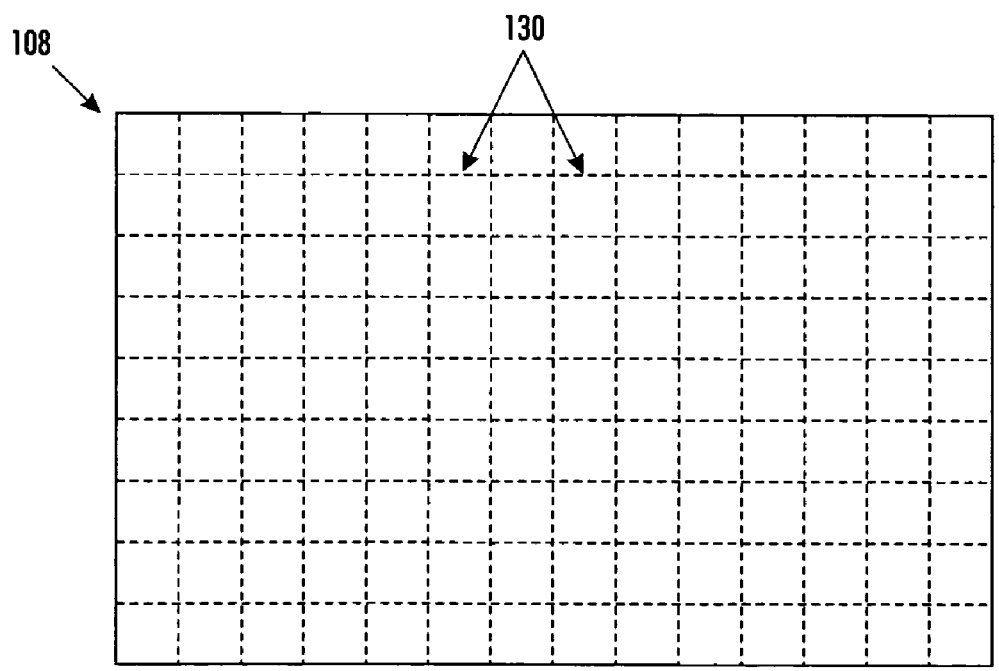
FIG. 6 is a top-view schematic representation of a liquid crystal diffuser.

The array in FIG. 6 can also be utilized to produce a strip of illumination by simultaneously activating an entire row (or column) of pixels 130. With the array shown in FIG. 6, individual pixels 130 can be activated to compensate for non-uniformities present in the imaging system, light source, platen, etc. The axial illumination profile can be adjusted for optimum uniformity by activating an appropriate number of the pixels 130 in the liquid crystal matrix shown in FIG. 6. More specifically, when calibrating the axial illumination profile, the imaging system 118 is periodically activated to scan the complete platen 102 (without a document present) with a white platen cover closed. The array shown in FIG. 6 can be adjusted to compensate for non-uniformities in the illumination profile as determined with the imaging system 118. The imaging system 118 can also be calibrated periodically by being positioned to view a white calibration strip 122 located on or adjacent the platen 102 and adjustments made for non-uniformities in the imaging system 118 response.

Thus, as shown above, an illumination system for document scanning uses patterned liquid crystal regions 116, 130 on (or in) the bottom surface of the platen glass 102 to selectively illuminate the area of the document 112 currently being scanned. As areas of the liquid crystal regions 116, 130 are inactivated, they become transparent, maintaining the total internal reflection further along the platen. Where active, the liquid crystal regions 116, 130 become diffusely reflective, disrupting the internal reflection and causing light 200 to be directed out of the platen 102, illuminating the document 112.

Addressing selected liquid crystal regions 116, 130 allows the light source 104 to remain fixed while the imaging system 118 scans the document 112, simplifying light source 104 mounting and harnessing. By packaging the light source 104 in a fixed position, the scan optics 118 can be made smaller and more robust and a smaller gap to the platen 102 or diffuser 108 may be used, allowing simpler power supply harnessing to be used for the imaging system 118.

Figure 7:
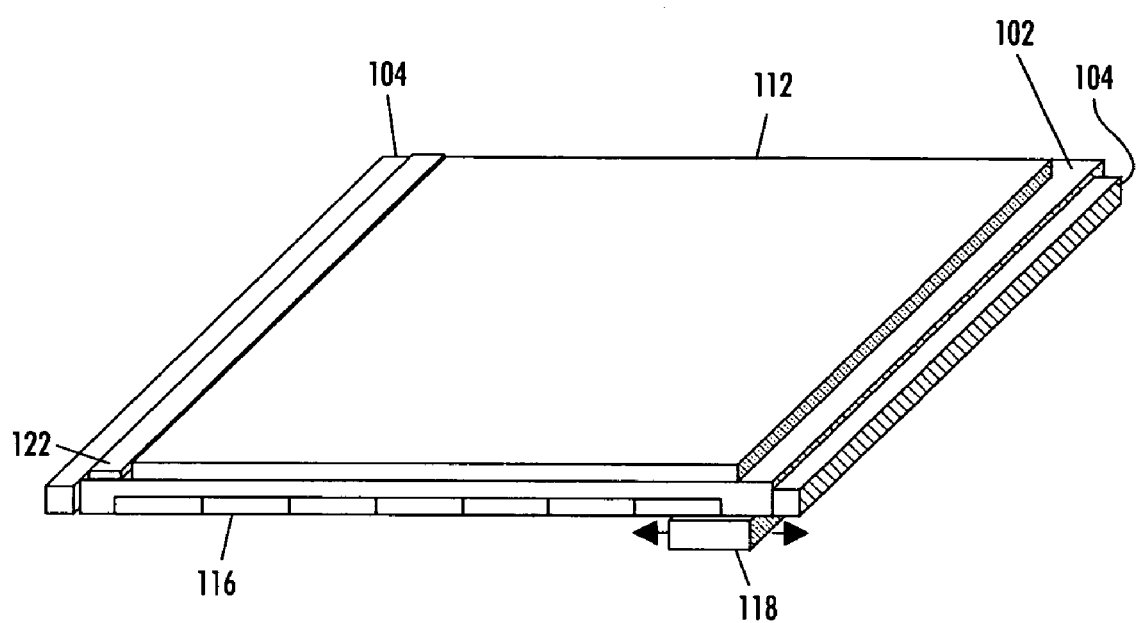
FIG. 7 is a perspective-view schematic representation of a scanner.
Figure 8:
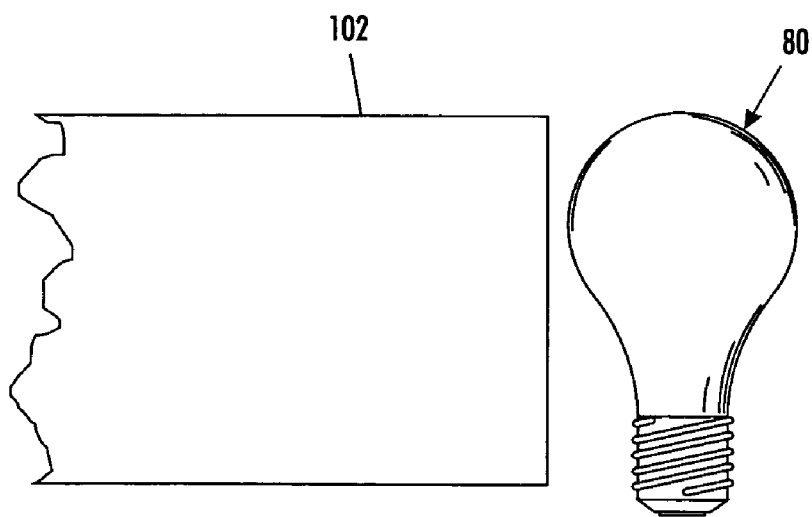
FIG. 8 is a cross-sectional schematic representation of the light source used with the platen.
Figure 9:
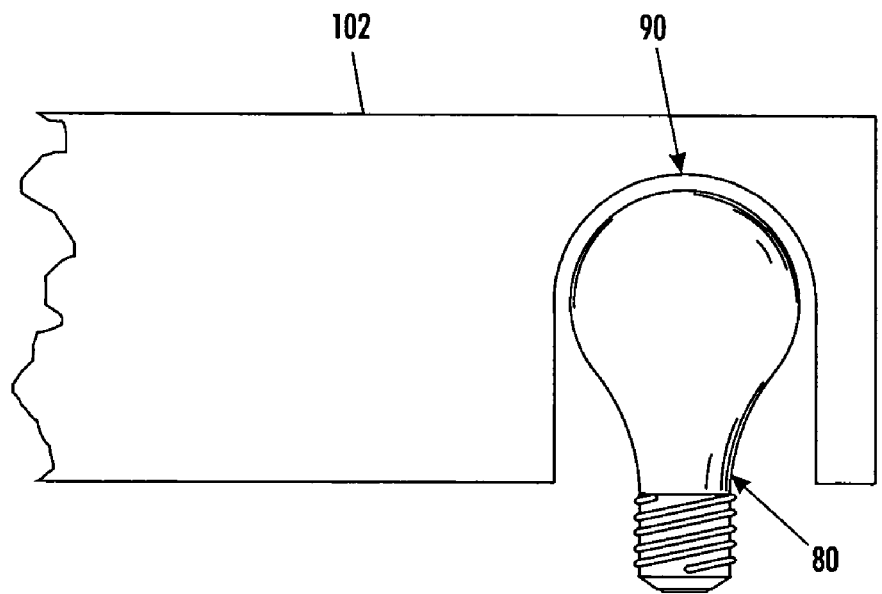
FIG. 9 is a cross-sectional schematic representation of the light source used with the platen.

FIGS. 7-9 are alternative embodiments which illustrate that many different lighting configurations can be utilized since the liquid crystal regions 116, 130 permit the light source to be fixed (immovable). The embodiment in FIG. 7 includes two light sources 104 positioned on opposite sides of the platen 102. Further, this embodiment illustrates that the calibration strip 122 can be positioned at different points, such as adjacent the light source 104. The light source can comprise any form of light emitter 80, such as incandescent, light emitting diode (LED), laser, etc., as shown in FIGS. 8 and 9. Further, as shown in FIGS. 8 and 9, the light source 80 can be positioned external to the platen 102 or within a recess 90 of the platen 102.

While the foregoing has been described in conjunction with various exemplary embodiments, it is to be understood that many alternatives, modifications and variations would be apparent to those skilled in the art. Accordingly, Applicants intend to embrace all such alternatives, modifications and variations that follow in this spirit and scope.

What is claimed is:
1. An illuminator comprising:
a platen;
a light source directing light into said platen;
liquid crystal sections adjacent the bottom of said platen; and a movable light sensor adjacent said liquid crystal sections, said movable light sensor, moving along a length of said platen, said liquid crystal sections being between said platen and said light sensor, wherein said liquid crystal sections are adapted to selectively cause a zone of light to be emitted from said platen, and wherein said liquid crystal sections move said zone of light along said length of said platen in conjunction with movement of said light sensor.

2. The illuminator according to claim 1, wherein said liquid crystal sections are further adapted to move said zone of light along a length of said platen over time.

3. The illuminator according to claim 1, wherein said zone of light runs from one edge of said platen to an opposite edge of said platen.

4. The illuminator according to claim 1, wherein said liquid crystal sections include multiple longitudinal sections adapted to change transparency.

5. The illuminator according to claim 1, wherein less than all of said liquid crystal sections are diffusely reflective at a time.

6. The illuminator according to claim 1, wherein said liquid crystal sections include multiple rectangular pixels adapted to change transparency.

7. The illuminator according to claim 1, wherein the planar dimensions of said liquid crystal sections approximately match the planar dimensions of said platen.

8. The illuminator according to claim 1, said light source comprising multiple light sources positioned on opposite sides of said platen.

9. A scanner comprising:
a platen;
a light source directing light into said platen;
a liquid crystal diffuser adjacent said platen; and
a movable light sensor adjacent said liquid crystal diffuser, said movable light sensor moving along a length of said platen,
wherein said liquid crystal diffuser is between said platen and said light sensor,
wherein said liquid crystal diffuser is adapted to cause a zone of light to be emitted from said platen, and
wherein said liquid crystal diffuser moves said zone of light along said length of said platen in conjunction with movement of said movable light sensor.

10. The illuminator according to claim 9, wherein said zone of light runs parallel to a length of said movable light sensor.

11. The illuminator according to claim 9, wherein said liquid crystal diffuser includes multiple longitudinal zone sections adapted to change transparency.

12. The illuminator according to claim 11, wherein less than all of said longitudinal zone sections are diffusely reflective at a time.

13. The illuminator according to claim 9, wherein said liquid crystal diffuser includes multiple rectangular pixels adapted to change transparency.

14. The illuminator according to claim 8, wherein the planar dimensions of said liquid crystal diffuser approximately match the planar dimensions of said platen.

15. The illuminator according to claim 9, said light source comprising multiple light sources positioned on opposite sides of said platen.

16. A document scanner comprising:
a platen adapted to support a document to be scanned;
a light source directing light into said platen,
liquid crystal sections in said platen; and
a movable light sensor adjacent said liquid crystal sections, said movable light sensor moving along a length of said platen,
wherein said liquid crystal sections are adapted to cause a zone of light to be emitted from said platen to said document,
wherein said liquid crystal sections move said zone of light along a length of said platen in conjunction with movement of said movable light sensor to allow said movable light sensor to sequentially sense sections of said document.

17. The illuminator according to claim 16, wherein said zone of light runs parallel to a length of said movable light sensor.

18. The illuminator according to claim 16, wherein said liquid crystal sections include multiple longitudinal zone sections adapted to change transparency.

19. The illuminator according to claim 16, wherein said liquid crystal sections include multiple rectangular pixels adapted to change transparency.

20. The illuminator according to claim 16, wherein the planar dimensions of said liquid crystal sections approximately match the planar dimensions of said platen.

* * * * *